United States Patent [19]

Parsons

[11] 4,218,168

[45] Aug. 19, 1980

[54] METHOD OF AND APPARATUS FOR LOADING A FLOATING VESSEL WITH FLOWABLE SOLIDS

[76] Inventor: Ward H. Parsons, 1202 Green Glen Rd., Birmingham, Ala. 35216

[21] Appl. No.: 933,502

[22] Filed: Aug. 14, 1978

[51] Int. Cl.³ .............................................. B65G 67/62
[52] U.S. Cl. .................................. 414/139; 114/122; 198/536; 414/786
[58] Field of Search ............... 414/137, 139, 140, 142, 414/143, 144, 145, 786, 161, 295; 193/3; 212/3; 198/524, 535, 536; 114/121, 122, 125; 73/65; 340/689

[56] References Cited

U.S. PATENT DOCUMENTS

| | | | |
|---|---|---|---|
| 2,651,423 | 9/1953 | Rose et al. | 414/139 |
| 2,800,991 | 7/1957 | Manierre | 198/530 X |
| 3,107,796 | 10/1963 | Eisele | 414/145 |
| 3,269,562 | 8/1966 | Holmes et al. | 414/139 |
| 3,339,707 | 9/1967 | Ludwig | 414/139 X |
| 3,604,386 | 9/1971 | Turci | 114/125 |
| 3,612,302 | 10/1971 | De Groot | 414/144 |
| 3,774,785 | 11/1973 | Gasseling | 414/295 |

*Primary Examiner*—L. J. Paperner
*Attorney, Agent, or Firm*—B. P. Fishburne, Jr.

[57] ABSTRACT

A slope or list sensor placed on a floating vessel detects listing thereof in either direction and produces an electrical signal which is proportional to the degree of list. An overhead movable flowable material delivery means responds automatically to the signal from the sensor and moves laterally of the vessel to load the vessel in such a way that the list is corrected automatically during the complete loading of the vessel. Various types of material delivery devices capable of responding to a signal can be employed.

3 Claims, 2 Drawing Figures

METHOD OF AND APPARATUS FOR LOADING A FLOATING VESSEL WITH FLOWABLE SOLIDS

BACKGROUND OF THE INVENTION

The customary method employed for loading a floating barge with flowable solids, such as sand or aggregate, involves loading personnel on the barge walking from side-to-side of the barge and measuring the distance from water level to a given point on the deck. After making such measurements, the barge personnel signal to an operator of the material delivery chute to divert the chute in relation to the barge so that the material is delivered to the side of the barge opposite from the list to return the barge to a level position. This is a rather slow, inaccurate and uneconomical method which the present invention seeks to correct and eliminate.

To comply with the duty to disclose known prior art under 37 C.F.R. 1.56, prior U.S. Pat. No. 3,612,302 is made of record herein. This patent discloses a loading means for a hopper craft which operates in response to list of the craft. A weight-operated linkage controls a material distributor which is pivotally mounted on the craft. The system is mechanical and requires the construction of permanent material distributing means on the barge or craft in contrast to the present invention where any standard barge may be loaded without alteration of its conventional structure. Thus, the invention has a far greater range of utility than the prior art and is far more practical and more economical.

SUMMARY OF THE INVENTION

A conventional list or slope sensor attached temporarily or permanently to a level portion of a barge senses list and produces a signal proportional to the degree of list immediately upon movement of the vessel from a null or level position. The electrical signal from the list sensor is transmitted by a cable to a dockside amplifier which transmits the amplified signal to a conventional servovalve mounted at a convenient location near an overhead swingable material delivery chute on the boom of a tower crane. The servovalve automatically controls the operation of a power actuator connected with the delivery chute, such as a hydraulic cylinder.

The electrically operated servovalve is also capable of controlling the operation of other forms of power mechanisms connected with the material delivery chute to cause movement thereof. The invention may also be embodied in other forms of list detecting means, such as photocell means, laser, infrared detectors, radar and the like, all of which can be mounted on the pier or dock above or near the floating vessel to detect listing thereof. All such equipment can produce a signal proportional to the degree of list as is the case with the particular list sensor described herein. An important aspect of the invention is the fact that it may be embodied entirely in commercially available conventional components, thus rendering the system both economical and practical as well as versatile and fully compatible with many types of barges or vessels now in use.

In lieu of the pivoted delivery chute for flowable solids disclosed in this application, it should be recognized that other forms of material delivery means capable of responding automatically to an electrical signal from a list sensor can be utilized for loading a barge or other vessel from port to starboard in the proper manner to correct listing of the vessel. The system also loads the vessel at the null point and does not constantly hunt during the loading process. In some cases, a crane equipped with a clamshell bucket may be utilized for loading in lieu of the disclosed loading apparatus. The crane will similarly respond to signals from a list sensor.

Other features and advantages of the invention will become apparent during the course of the following description.

DETAILED DESCRIPTION

Figure 1:
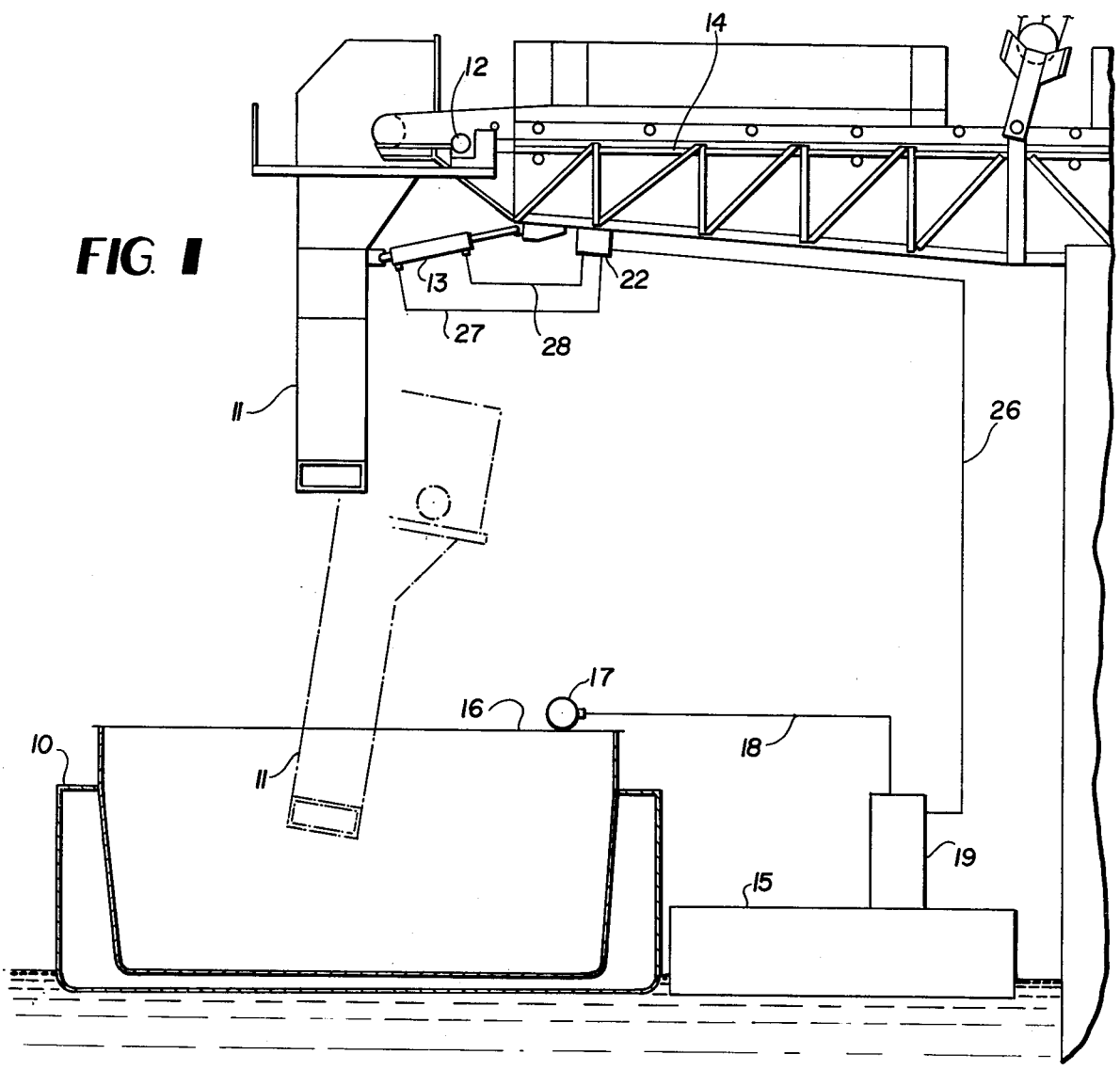
FIG. 1 is a partly schematic elevational view of apparatus employed in the practice of the method of loading floating vessels with flowable solids according to the invention.

Referring to the drawings wherein like numerals designate like parts, the numeral 10 designates a barge or other floating vessel to be loaded with flowable solids from an overhead material delivery chute 11 which is laterally swingable on a horizontal axis pivot 12 by a power device 13 connected therewith, such as a hydraulic or pneumatic cylinder. The chute 11 and cylinder 13 are both carried by the adjustable boom 14 of a tower crane of conventional construction, the crane being located adjacent to a dock or pier 15 alongside of which the barge 10 is positioned to be loaded with material from the chute 11.

The barge includes a normally level support member 16 on which a conventional list or slope sensor 17 is temporarily or permanently fixed. The slope sensor 17 may be of the type manufactured and sold by Honeywell, 1885 Douglas Drive North, Minneapolis, Minn. 55422, as Slope Sensor 134847A, or an equivalent device. The slope sensor and its operation are well known and need not be described in detail. Suffice it to say that the sensor electromagnetically measures any deviation from level of the support on which it is mounted and produces an electrical signal proportional to the degree of deviation.

Figure 2:
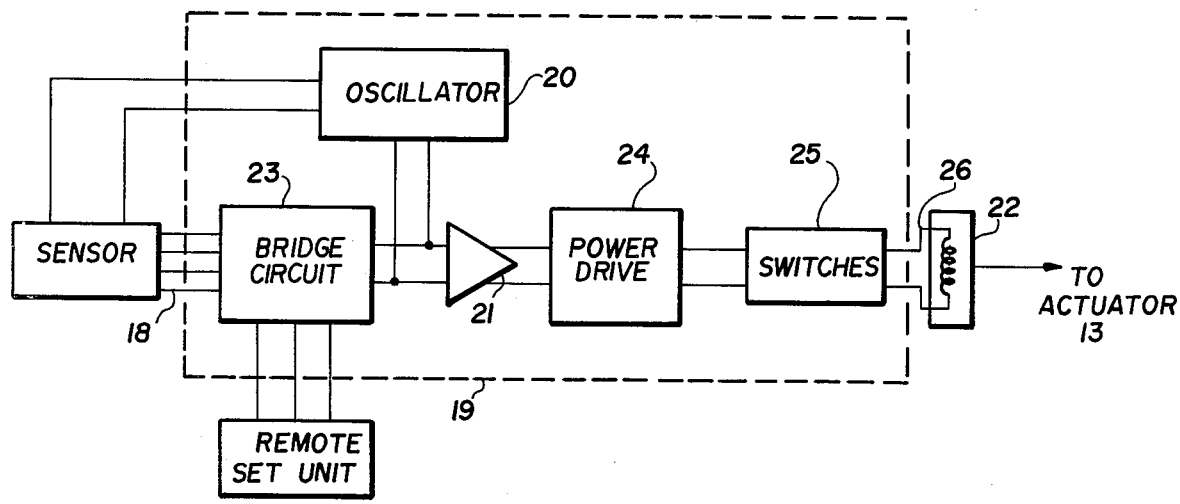
FIG. 2 is a block diagram of conventional components employed to sense list of the vessel being loaded and to automatically control the movement of a material delivery chute to correct list.

The list or slope sensor 17 is electrically connected by a multiconductor cable 18 to an amplifier unit 19 mounted on the dock 15 or other convenient remote point. The amplifier is also conventional and is manufactured and sold by Honeywell at the above-referenced address as R7232A Remote Amplifier. The amplifier 19 is indicated diagrammatically in FIG. 2 and need not be described in detail herein as it is entirely conventional. Power is obtained from a 12 volt D.C. source, not shown. An oscillator 20 provides excitation to the external list sensor 17, FIG. 2, and in addition supplies an input to the amplifier 21, setting the frequency of the pulsewidth operated servovalve 22, to be further described. A bridge 23 accepts floating A.C. signals from the sensor 17 and rectifies the signals. A D.C. error signal from the bridge 23 is summed with a signal from the oscillator 20 to form the input to amplifier 21. The output of the amplifier operates a power drive 24 which is coupled through switches 25 with the servovalve 22.

The servovalve 22 may be mounted as shown in FIG. 1 on the boom 14 and is connected by a cable 26 with the amplifier unit 19. Servovalve 22 is also a conventional device manufactured and sold by Honeywell as Mobile Servovalve V7059A. The servovalve, which need not be described in detail, consists of a spool valve and a torque motor. The torque motor consists of an armature mounted on a pivot or flexible arm suspended in the air gap of a magnetic field. Two pole pieces respectively polarized north and south form the framework around the armature and provide magnetic flux paths. When current flows through coils on the armature, the armature ends are polarized and each end is attracted to one pole piece while being repelled by the other. The torque produced by the armature is restrained by centering springs. A push rod on one end of the armature forms the mechanical connection between the torque motor and spool valve. As depicted in FIG. 1, the spool valve of servovalve 22 has fluid outlet and return lines 27 and 28 coupled with inlet and return ports of the power cylinder 13 in a conventional manner.

It may now be readily understood that the described conventional equipment allows the vessel loading system to operate in the following manner.

Initially, any listing of the vessel 10 is detected by the sensor 17 and a resulting electrical signal from the sensor proportional to the list of the vessel is delivered through cable 18 to the amplifier unit 19 as described. In turn, the electrical servovalve 22 receives a pulsed signal from the amplifier means which causes it to automatically operate the cylinder 13 or other equivalent actuator to swing the delivery chute 11 in the proper direction to correct the list of the vessel by delivering flowable solids to the high or light side of the vessel opposite the list. The method or operation in contrast to the prior art is entirely automatic and essentially instantaneous and is not dependent on a human operator or operators. Consequently, the operation of the system is much more precise and sensitive than the prior art. Minute deviations of the floating vessel from the null or level position are detected by the sensor 17 and simultaneously the delivery chute 11 will be adjusted a precise required distance in the proper direction to correct the list. In this manner, throughout the entire loading procedure, the invention will constantly correct list with the result that the vessel is perfectly loaded in the port to starboard plane.

It is again emphasized that a preferred embodiment of the invention has been shown and described and a variety of equivalent equipment can be employed, as explained previously.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A method of loading a floating vessel with flowable solid material comprising the steps of electrically sensing a port-starboard list of a vessel undergoing loading with flowable solid material by operation of an onboard electrical list sensor and thereby producing an electrical signal which is proportional to the degree of list of the vessel at a given instant, instantly utilizing said electrical signal to operate an automatically responsive on-shore flowable solid material delivery device in a back-and-forth port-to-starboard direction to continually correct the listing of the vessel and return it and the onboard electrical list sensor to a null position by delivering said material to the high side of the vessel away from the list, and continuing the above steps of the method until the floating vessel is fully loaded with the flowable solid material.

2. A method of loading a floating vessel with flowable solid material is defined in claim 1, and the additional step of amplifying the electrical signal produced by the list sensor and converting it to a signal form usable by an on-shore control device for the solid material delivery device.

3. An apparatus for loading a floating vessel with flowable solid material automatically and in a continuous process comprising an off-vessel on-shore flowable solid material delivery device capable of moving back and forth above a vessel undergoing loading in a port-to-starboard direction, an on-shore electrically operated actuator means for said delivery device operatively coupled thereto, an onboard electrical list sensor fixed to the vessel undergoing loading and generating instantly an electrical signal which is proportional to the degree of list of the vessel in the port-to-starboard plane at any given instant, and an on-shore electrical amplifier for said signal and control means for said actuator means coupled between said list sensor and actuator means and responding instantly to said signal of the list sensor and automatically moving the delivery device relative to the vessel undergoing loading to continually return the vessel and the list sensor to a null position by delivering flowable solid material to the high side of the vessel away from the list.

* * * * *